United States Patent
Shi et al.

(10) Patent No.: US 11,208,499 B2
(45) Date of Patent: Dec. 28, 2021

(54) AMYLASE-DEGRADED ORGANIC ACID ANHYDRIDE SUBSTITUTED STARCHES AND METHODS OF PREPARING THE SAME

(71) Applicant: Kansas State University Research Foundation, Manhattan, KS (US)

(72) Inventors: Yong-Cheng Shi, Manhattan, KS (US); Yanjie Bai, Jiangsu (CN); Zhenhua Sun, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 46 days.

(21) Appl. No.: 16/728,400

(22) Filed: Dec. 27, 2019

(65) Prior Publication Data

US 2020/0207878 A1 Jul. 2, 2020

Related U.S. Application Data

(60) Provisional application No. 62/786,021, filed on Dec. 28, 2018.

(51) Int. Cl.
*C08B 31/04* (2006.01)

(52) U.S. Cl.
CPC .................. *C08B 31/04* (2013.01)

(58) Field of Classification Search
CPC .................................................. C08B 31/04
See application file for complete search history.

(56) References Cited

U.S. PATENT DOCUMENTS 9,458,252 B2 10/2016 Shi et al.

OTHER PUBLICATIONS

Huang et al., Food Hydrocolloids, 2010, 24, p. 60-65. (Year: 2010).*
Madsen et al., Die Starke, 1973, 25(9), p. 304-308. (Year: 1973).*

* cited by examiner

*Primary Examiner* — Jonathan S Lau
(74) *Attorney, Agent, or Firm* — Hovey Williams LLP (57) ABSTRACT

Water soluble, lipophilic starches are provided, which comprise a mixture of functionalized high and low molecular weight maltodextrin molecules. The starches may be formed by dispersing a granular starch in a liquid medium to form a slurry that is simultaneously cooked and subjected to enzyme hydrolysis. Following hydrolysis, the starch is functionalized with an organic acid anhydride reagent, such as octenylsuccinic anhydride. The organic acid anhydride substitution occurs randomly and at various locations within the maltodextrin molecules.

10 Claims, 5 Drawing Sheets

AMYLASE-DEGRADED ORGANIC ACID ANHYDRIDE SUBSTITUTED STARCHES AND METHODS OF PREPARING THE SAME

CROSS-REFERENCE TO RELATED APPLICATION

This application claims the benefit of U.S. Provisional Patent Application No. 62/786,021, filed Dec. 28, 2018, which is incorporated by reference herein in its entirety.

BACKGROUND OF THE INVENTION

Field of the Invention

Embodiments of the present invention are directed toward enzyme degraded starches that have been functionalized with a lipophilic moiety, particularly an organic acid anhydride and methods of preparing the same. Starches according to the present invention can be used as emulsifying agents, among other applications.

Description of the Prior Art

Native starch is partially crystalline and not soluble in water at room temperature. Also, native starch molecules are hydrophilic and do not possess emulsifying properties. A number of references such as U.S. Pat. Nos. 2,661,349 and 6,037,466 disclose introducing hydrophobic groups to the starch by reaction with cyclic dicarboxylic acid anhydrides so that the starch can be used as an emulsion stabilizer.

Octenylsuccinic anhydride (OSA) treated starch, prepared by adding up to 3% OSA, has been approved by the FDA for food use and can be used in food and beverage applications, such as in encapsulation of vitamins and flavors. Starch may also be reacted with greater than 3% OSA for non-food applications, such as in oil- and petroleum-based cosmetics, or pharmaceutical pastes, alcohol-based lotions, body deodorant sprays, and encapsulation of fragrances, clouds, and oils.

Octenylsuccinic anhydride-modified starch (OS starch) is a chemically modified starch with broad applications in the food industry as an emulsion stabilizer (Trubiano, 1986). OS starches are traditionally obtained from granular starch in an aqueous slurry reaction system (Trubiano, 1986; Wurzburg, 2006). After modification, OS starch may be further cooked and hydrolyzed by enzymes for emulsification applications. OS esters have been prepared from granular starch (see, e.g., U.S. Pat. No. 9,458,252) and soluble maltodextrin. The soluble OS maltodextrin had a different molecular structure from OS granular starch. OS starch prepared from maltodextrin exhibited substitution on O-2, O-3, and O-6 as well as reducing ends, whereas granular OS starch showed OS substitution on O-2 and O-3 positions for the granular OS starch. When OSA is reacted with granular starch, the starch remains in its compact granular form and substitutions are localized in the amorphous region of the starch granule.

SUMMARY OF THE INVENTION

Embodiments of the present pertain to approaches for preparing water-dispersible, lipophilic starches according to one of several different approaches, each of which producing unique starches with different organic acid anhydride substitution distributions. In one approach, the granular starch is first reacted with the organic acid anhydride, and then cooked and hydrolyzed by α-amylase to produce maltodextrins. In a second approach, granular starch is cooked and hydrolyzed by α-amylase to make a maltodextrin, and the resulting soluble maltodextrin is then reacted with the organic acid anhydride to produce maltodextrins. In a third approach, the granular starch may be cooked and reacted with the organic acid anhydride, which is followed by α-amylolysis.

According to one embodiment of the present invention there is provided a method of preparing a lipophilic starch. The starch is prepared by dispersing a quantity of a granular starch in a liquid medium to form a starch slurry. The starch slurry is heated to cause cooking of the starch while treating the starch with amylase enzymes to hydrolyze the starch. Once reaching a desired degree of hydrolyzation, the amylase enzymes are neutralized to stop the hydrolysis of the starch. Next, an organic acid anhydride reagent is added to the hydrolyzed starch. The organic acid anhydride reagent has the general formula wherein R is a dimethylene or trimethylene group and R' is a linear, branched or cyclic alkyl, alkenyl, aralkyl or aralkenyl group having 2 to 20 carbon atoms. The hydrolyzed starch is reacted with the organic acid anhydride reagent to form the lipophilic starch.

According to another embodiment of the present invention, there is provided a water soluble, lipophilic starch comprising a mixture of low molecular weight maltodextrin molecules having a glucose unit chain length of less than 12 and high molecular weight maltodextrin molecules having a glucose unit chain length of greater than 12. Both the low and high molecular weight maltodextrin molecules comprise octenylsuccinate moieties substituted randomly throughout the starch chains. The substitutions occur at O-2, O-6, O-6, and at the reducing ends of the maltodextrin molecules.

According to yet another embodiment of the present invention, emulsions are provided comprising a dispersed phase and a continuous phase. The continuous phase comprises an amount of a water soluble, lipophilic starch as described herein.

DETAILED DESCRIPTION OF THE PREFERRED EMBODIMENT

The reaction of starch and octenylsuccinic anhydride (OSA) produces lipophilic starch that can stabilize oil-in-water emulsions. The functional properties of octenylsuccinate (OS) starch depend on its degree of substitution (DS), distribution of OS groups, and molecular structure. The present invention generally pertains to methods of preparing α-amylase-degraded OS starches with different OS distributions. In one approach, granular starch is reacted with OSA and then cooked and hydrolyzed by α-amylase to produce maltodextrins (gOSMs) with ca. 7.5 dextrose equivalent (DE). In a second approach, granular starch is cooked and hydrolyzed by α-amylase to make a maltodextrin of DE 7.5 and then reacted with OSA to produce OS maltodextrins (sOSMs) with DS of ca. 0.02 and 0.09. Products produced according to the present invention exhibit better emulsification properties than conventionally prepared materials and can be used in a variety of applications including forming beverage emulsions, encapsulation of vitamins and bioactive materials, and drug delivery.

According to an embodiment of the present invention a granular starch is processed to form a water-soluble, lipophilic starch. Processes according to certain embodiments of the present invention comprise one or more of the steps of forming a starch slurry comprising the granular starch, treating the starch slurry with amylase enzymes, cooking the starch, modifying the starch with a quantity of an organic acid anhydride, and drying the modified starch.

The starch to be modified according to the present invention may be native, converted, or derivatized. Exemplary starches include those derived from corn, potato, wheat, rice, tapioca, sago, sorghum, waxy maize, waxy wheat, waxy potato, waxy tapioca, high amylose potato, high amylose wheat, or high amylose corn.

In certain embodiments, the process begins by dispersing a quantity of a granular starch in a liquid medium to form a starch slurry. The liquid medium may comprise water and/or alcohol, wherein the alcohol is selected from the group consisting of methanol, ethanol, isopropyl alcohol, and mixtures thereof. In certain embodiments, the starch slurry comprises from about 5% to about 40% by weight, from about 7% to about 30% by weight, or from about 10% to about 25% by weight of the granular starch.

Next, starch slurry is heated to cause gelatinization of the starch (i.e., the crystalline structure of the granular starch is destroyed during this process). By cooking the starch, the amylase can hydrolyze bonds that were present in both the crystalline and amorphous regions of the starch granules. This contrasts with conventional processes that hydrolyzed uncooked starch (namely acid hydrolysis) in which the amorphous regions of the partially crystalline starch granule are preferably hydrolyzed. In certain embodiments, the heating step comprises heating the starch slurry to a temperature of from about 55° C. to about 110° C., from about 70° C. to about 100° C., or from about 80° C. to about 95° C. While the starch is being cooked, amylase enzymes are added to the starch slurry to hydrolyze the starch. In certain embodiments, amylase enzymes are mixed with starch in the slurry before cooking. The amylase enzyme used may comprise isoamylase, α-amylase, β-amylase, amyloglucosidase, or any other enzyme within the amylase family. However, α-amylase is preferred. In certain embodiments, the amylase enzyme is added to the starch slurry at a level of from about 0.01% to about 1%, from about 0.05% to about 0.75%, from about 0.075% to about 0.5%, or about 0.1% by weight based upon the weight of the starch. Preferably, during the hydrolysis and cooking step, the starch slurry has a pH of from about 5.5 to about 7, or from about 6.0 to about 6.5. The hydrolysis step continues until the starch has degraded to the desired level. In certain embodiments, this length of time is from about 1 minute to about 4 hours, from about 2 minutes to about 60 minutes, or from about 5 minutes to about 45 minutes.

After reaching the desired level of starch degradation, the amylase enzymes are neutralized. In certain embodiments, neutralization of the enzymes is achieved by adjusting the pH of the slurry to below 4.0, below 3.5, or below 3.0 using a mineral acid, such as HCl, for example. In certain embodiments, during enzyme neutralization, the pH of the starch slurry is adjusted to from about 2.5 to about 3.5, or about 3.0. Alternatively, neutralization of the enzymes can be achieved by placing the vessel comprising the starch slurry into boiling water for approximately 10 minutes.

In certain embodiments, the hydrolyzed starch may be recovered, such as by freeze drying or spray drying, and saved further processing, although this need not always be the case.

Next, an organic acid anhydride reagent is added to the hydrolyzed starch and reacted with the hydrolyzed starch to form the water-soluble, lipophilic starch. If the hydrolyzed starch has been previously dried, the hydrolyzed starch is dispersed in water, or other liquid medium, prior to the addition of the organic acid anhydride reagent to form a starch mixture having a solids content of from about 25% to about 55% by weight, from about 30% to about 50% by weight, or from about 35% to about 45% by weight.

In certain embodiments, the organic acid anhydride reagent has the general formula wherein R is a dimethylene or trimethylene group and R' is a linear, branched or cyclic alkyl, alkenyl, aralkyl or aralkenyl group having 2 to 20 carbon atoms. Most preferably, the organic acid anhydride reagent is octenylsuccinic anhydride (OSA). The organic acid anhydride reagent is generally added to the hydrolyzed starch at a level of from about 0.5% to about 100% by weight, based upon the dry weight of the starch. In still other embodiments, the organic acid anhydride reagent is generally added to the hydrolyzed starch at a level of between about 1% to about 25% by weight, or even between about 2% to about 9% by weight, based upon the dry weight of the starch.

In certain embodiments, the hydrolyzed starch is not washed to remove enzyme residues or other materials prior to its reaction with the organic acid anhydride. In certain embodiments of the present invention, it is desirable to provide hydrolyzed and functionalized starch that comprises a distribution of both short and long-chain dextrins so that the beneficial characteristics of the short chain dextrins can be realized. Accordingly, care should be taken to avoid removal of the short chain dextrins prior to reaction with the organic acid anhydride.

In an embodiment of the present invention a water soluble, lipophilic starch is formed that comprises a mixture of low molecular weight maltodextrin molecules having a glucose unit chain length of less than 12 and high molecular weight maltodextrin molecules having a glucose unit chain length of greater than 12. Both the low and high molecular weight maltodextrin molecules are functionalized with organic acid anhydride moieties, preferably octenylsuccinate moieties, substituted randomly throughout the starch chains. Preferably, the substitutions occur at O-2, O-3, O-6, and at the reducing ends of the maltodextrin molecules.

In particular embodiments, products according to the present invention comprise from about 10% to about 50%, from about 15% to about 45%, from about 20% to about 40%, or about 30% by weight of the low molecular weight dextrins. In certain embodiments, the products according to the present invention comprise from about 50% to about 90%, from about 55% to about 85%, from about 60% to about 80%, or about 70% by weight of the high molecular weight maltodextrin molecules.

In certain embodiments, the degree of substitution in both the high and low molecular weight maltodextrin molecules exhibit a degree of substitution of from about 0.005 to about 0.15, from about 0.01 to about 0.12, or from about 0.02 to about 0.1.

In characterizing the products by enzyme, it was found that isoamylase action was significantly inhibited for gOSMs and sOSMs, indicating substitutions near the branching points of starch chains. Successive β-amylase conversion rates of gOSMs were significantly higher than sOSMs, suggesting that the OS substitution in sOSMs were more toward the non-reducing end than in gOSMs. Similar results were observed by amyloglucosidase hydrolysis. In addition, sOSMs were less converted by α-amylase than gOSMs. OS starches with different substitution distributions were prepared with two approaches. One product (gOSMs) had localized OS substitution near the branching points or non-reducing ends; the other product (sOSMs) had OS groups distributed randomly throughout the starch chains, and OS substitutions were found close to the branching points as well as the non-reducing ends.

As noted above, the water soluble, lipophilic starches of the present invention are particularly useful as emulsifying agents. Therefore, embodiments of the present invention also include emulsions that have been prepared using the starches described above. In one embodiment, the emulsion comprises a dispersed phase and a continuous phase, with the continuous phase comprising an amount of the water soluble, lipophilic starch.

In preferred embodiments according to the present invention, the continuous phase comprises water and the dispersed phase comprises a liquid that is immiscible with water, such as an oil, bioactive compound, pharmaceutical, etc. In certain embodiments, the starch is initially added to the continuous phase and dissolved prior to the addition of the dispersed phase, although, this need not always be the case. In certain embodiments, the continuous phase comprises from about 1% to about 15%, from about 2.5% to about 12%, or from about 5% to about 10% by weight, based upon the weight of the continuous phase, of the water soluble, lipophilic starch. Also, in certain embodiments, the weight ratio of the water soluble, lipophilic starch to the dispersed phase is from about 0.1:1 to about 5:1, about 0.5:1 to about 3:1, or about 1:1 to about 2:1.

Upon addition of the components to be emulsified, the mixture may undergo some kind of blending or mixing operation, such as shear mixing, in order to disperse droplets of the dispersed phase within the continuous phase.

In certain embodiments, the dispersed phase comprises a volume average droplet size of from about 0.1 µm to about 10 µm, from about 0.5 µm to about 7.5 µm, or from about 1 µm to about 5 µm. Preferably, the emulsion formed is quite stable, avoiding phase separation for at least a period of 24 hours at 50° C. Even more preferably, the droplets of the dispersed phase avoid aggregation that would increase their volume average droplet size by more than 100%, more than 75%, or more than 50% for at least a period of 24 hours at 50° C.

EXAMPLES

The following examples set forth exemplary embodiments of the present invention. It is to be understood, however, that these examples are provided by way of illustration and nothing therein should be taken as a limitation upon the overall scope of the invention.

Example 1

Materials

Waxy maize starch is available from National Starch LLC. (Bridgewater, N.J.). *Bacillus* sp. α-amylase (A6380-100MG, type II-A), α-amylase from porcine pancreas (A3176-5MU, type VI-B), and β-amylase from barley (A-7130-10KU, type II-B) were purchased from Sigma-Aldrich (St. Louis, Mo.), and the enzyme activity was 839, 23, and 55.7 units/mg solid, respectively. The enzyme activity unit for α-amylase as suggested by Sigma-Aldrich is defined as one unit liberating 1.0 mg of maltose from starch in 3 min at pH 6.9 at 20° C. For β-amylase, enzyme activity is defined as one unit liberating 1.0 mg of maltose from starch in 3 min at pH 4.8 at 20° C. α-amylase (Termamyl 120L) was obtained from Novozymes (Franklinton, N.C.); its enzyme activity was 120KNU-T/g. One KNU is defined as the amount of enzyme that dextrinizes 5.26 g of starch (Merck Amylum soluble) per hour under standard conditions (37.0° C., 0.0003MCa.$^{2+}$, and pH5.6). Glucose, maltose, and a series of oligosaccharides from maltotriose to maltoheptaose were purchased from Sigma-Aldrich (St. Louis, Mo.). Other chemicals were analytical grade.

Preparation of α-Amylase Degraded OS Starch

Approach 1

Figure 1:
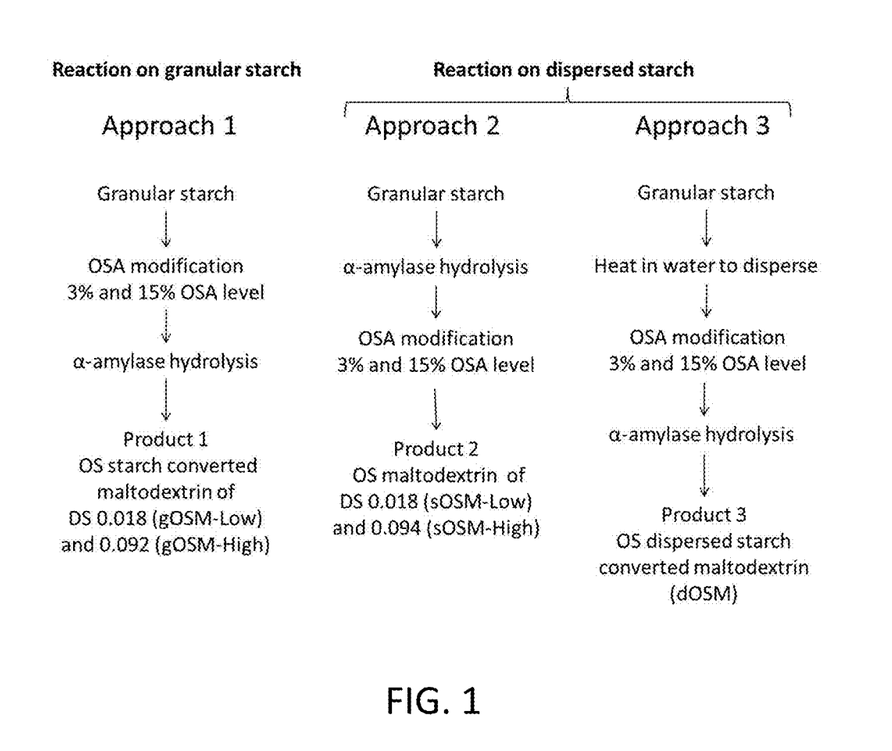
FIG. 1 is a chart illustrating three approaches to prepare α-amylase-degraded octenylsuccinic anhydride (OSA)-modified starch.

Preparation of α-amylase-degraded OS starch from approach 1 is shown in FIG. 1. Granular waxy maize starch was first reacted with OSA in an aqueous slurry system as previously described (Bai & Shi, 2011). Briefly, starch suspension (250 mL) of 40% solid content was adjusted to pH 7.5 by 3% (wt %) NaOH. OSA (3% or 15% based on the weight of starch) was added to the starch slurry while pH was maintained at 7.5 by 3% (wt %) NaOH during the reaction. After pH stabilized for 30 min, the reaction was terminated by adjusting pH to 6 with 1 N HCl. OS starch was recovered by filtration, washed by methanol (400 mL), and dried in an oven at 45° C. Degree of substitution (DS) was determined by NMR spectroscopy.

The OS starches were converted to OS maltodextrins by α-amylase hydrolysis as described by Lumdubwong and Seib (2001) with some modifications. α-amylase (Termamyl 120L) (0.1% based on the weight of starch) was added to a starch slurry of 13% solids with 200 ppm Ca$^{2+}$. pH of the slurry was adjusted to 6.0-6.4 by 1 N NaOH. Starch hydrolysis was carried out at 94° C. with different reaction time depending on the DS of OS starches. α-amylolysis was stopped by adjusting pH to 3.0 by 1.0 N HCl. Starch slurry was held at 94° C. for another 10 min and cooled in an ice-water bath. After the temperature dropped below 60° C., pH was adjusted to 6.0 by 1 N NaOH. The maltodextrin obtained was filtered and recovered by freeze-drying.

Approach 2

Granular waxy maize starch was first hydrolyzed by α-amylase as described in Approach 1. Different reaction time was used to achieve the same dextrose equivalent (DE) of the OS maltodextrins obtained from Approach 1. The freeze-dried maltodextrin was then dispersed in water at 40% solid concentration and reacted with 1.89 or 12.20% OSA (wt. % based on the weight of maltodextrin) to achieve the same DS of the OS maltodextrins obtained from Approach 1. The amount of OSA added in the reaction was calculated based on the reaction efficiency of OSA reaction as previously reported (Bai & Shi, 2011). The OSA modified maltodextrins were recovered by freeze drying, washed by methanol to remove the unreacted OSA and dried in a vacuum drier. DS was determined by NMR spectroscopy.

Characterization of OS Starches

Determination of Dextrose Equivalent (DE)

DE of α-amylase hydrolyzed products was determined by the Nelson-Somogyi method (Somogyi, 1952).

NMR Spectroscopy

OS starches were exchanged with D$_2$O twice, freeze-dried, and dissolved in D$_2$O (10% wt. %) for analysis. NMR spectroscopy experiments were performed on a Varian (now Agilent; Santa Clara, Calif.) 500 MHz NMR System spectrometer. The NMR spectrometer is equipped with a cryogenic carbon enhanced 5 mm triple-resonance inverse detection pulse field gradient probe operating at 499.839 and 125.697 MHz for $^1$H and $^{13}$C, respectively. Temperature was set at 25° C. The $^1$H spectra were collected in 32 individual scans with a sweep width of 16 ppm and a delay time of 1 s. The $^{13}$C spectra maltodextrin and OS maltodextrin were collected in 2000 scans and a delay time of 1 s. The procedure for determining DS was performed as previously reported (Bai, Shi, Herrera & Prakash, 2011).

Gel Permeation Chromatography (GPC)

Maltodextrins (4 mg) were dissolved in DMSO (4 mL), stirred at room temperature for 12 h, and filtered through a 2 μm filter. GPC analysis was performed as previously described (Cai, Shi, Rong & Hsiao, 2010).

High Performance Anion-Exchange Chromatography (HPAEC)

HPAEC (Dionex ICS-3000, Dionex Corp., Sunnyvale, Calif.) was equipped with a pulsed amperometric detector, a guard column, a CarboPac PA1 analytical column, and an AS-DV autosampler. Eluent A was 150 mM NaOH, and eluent B was 150 mM NaOH containing 500 mM sodium acetate. The gradient program for debranched starch was: 85% of eluent A at 0 min, 30% at 20 min, 25% at 30 min, 0% at 35 min, and 85% at 41 min as previously described (Cai & Shi, 2010). The gradient program for hydrolysates from amyloglucosidase and β-amylase was: 85% of eluent A at 0 min, 45% at 15 min, 40% at 20 min, 0% at 21 min, and 85% at 26 min. The separations were carried out as previously described (Cai & Shi, 2010). The column was qualitatively calibrated for linear dextrins with glucose, maltose, and a series of oligosaccharides from maltotriose to maltoheptaose.

Amyloglucosidase Hydrolysis

Starch (0.1 g) was dissolved in 5 mL acetate buffer (0.05M, pH 4.5). Amyloglucosidase (1% based on the weight of starch) was added and incubated at 55° C. for 24 h. Another 1% amyloglucosidase was added to the starch solution and incubate for another 24 h. The solution was diluted and analyzed by HPAEC and GPC.

β-Amylase Hydrolysis

Maltodextrin or OS maltodextrin (0.1 g) was dissolved in 10 mL acetate buffer (0.05M, pH 4.8). β-amylase (1% wt % based on the weight of starch) was added. Starch solutions were incubated at 40° C. for 1.5 h followed by heating in a boiling water bath for 10 min to denature the enzymes. The hydrolysates were analyzed by HPAEC and GPC. β-limit values were determined as the ratio of maltose generated in the β-amylase hydrolysis and the total content of maltose in the starch before hydrolysis.

Preparation of α-Limit Dextrin

α-limit dextrins of OS maltodextrin were prepared as described in Xu & Seib (1997) with a few modifications. OS maltodextrins (1.0 g), sodium acetate trihydrate (0.15 g), calcium chloride (5 mg) and *Bacillus* α-amylase (5 mg) were weighed into a 50 mL glass centrifuge tube. Water (15 mL) was added to the tube, and the mixture was shaken until the maltodextrin dissolved. The tubes were placed in a water bath at 37° C. and shaken at 100 RPM. The temperature of the bath was raised to 80° C. After 2 h at 80° C., the tubes were cooled to 45° C. Porcine pancreatic α-amylase (5 mg protein) was added, and the mixture was incubated at 45° C. for 18 h. The enzyme was denatured by heating in a boiling water bath for 15 min. After cooling to room temperature, the aliquot was filtered through a filter paper (0.45 μm) and freeze-dried.

Debranching and Successive β-Amylolysis

Starch (0.5 g) was dispersed in 25 ml acetate buffer (0.05M, pH 3.5) and heated in a boiling water bath at 100° C. for 1 h. After the starch solution cooled to 50° C., isoamylase (1% based on the weight of starch) was added, and the solution was incubated at 50° C. for 24 h. Samples of 10 mL were collected for β-amylase hydrolysis. The rest of the samples were diluted and analyzed by HPAEC.

Starch solution collected after debranching was cooled to 40° C., and pH was brought up to 4.8 by 0.05 M sodium acetate. β-amylase (1% based on the weight of starch) was added and the starch solution was incubated at 40° C. for 24 h. After complete β-amylase hydrolysis, the solution was freeze-dried and analyzed by HPAEC.

Results

Figure 2:
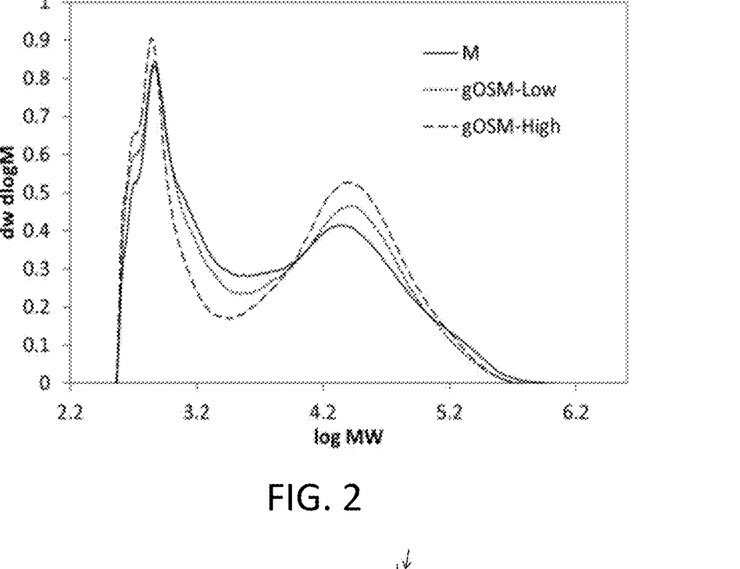
FIG. 2 is a chart of the molecular size distribution of maltodextrins with same dextrose equivalent (DE) from native starch (M) and granular octenylsuccinate starch with degree of substitution of 0.018 (gOSM-Low) and 0.092 (gOSM-High)

Preparation of α-Amylase-Degraded OS Waxy Maize Starches with Different Substitution Patterns The action of α-amylase on starch was altered after OS substitution. When -amylolysis was performed under the same conditions (0.1%-amylase, 1.5 h and 94° C.), the products from the native starch and OS starches with DS 0.018 and 0.092 had DE of 15.9, 10.7, and 5.0, respectively (Table 1). To obtain maltodextrins with similar DE, α-amylolysis time was adjusted to 1.0, 1.25, and 3.0 h for native starch and OS starches of DS 0.018 and 0.092, respectively (Table 1). The resulted maltodextrin (M) and OS maltodextrins of DS 0.018 (gOSM-Low) and 0.092 (gOSM-High) had a DE of ca. 7.5 (Table 2) with the same molecular size range of 4.1E+02 to 7.2E+05 g/mol (FIG. 2). In approach 2, OSA was reacted with the maltodextrin (DE 7.5) prepared from α-amylolysis of native waxy maize starch. OS maltodextrins of DS 0.018 (sOSM-Low) and 0.094 (sOSM-High) were obtained.

TABLE 1

Dextrose equivalent (DE) and conversion time for maltodextrin (M) and octenylsuccinate maltodextrins from approach 1 of DS 0.018 (gOSM-Low) and DS 0.092 (gOSM-High).

|  | DE after 1.5 h α-amylolysis | Conversion time (h) for DE 7.5 |
|---|---|---|
| M | 15.9 | 1.00 |
| gOSM-Low | 10.7 | 1.25 |
| gOSM-High | 5.0 | 3.00 |

Figure 3:
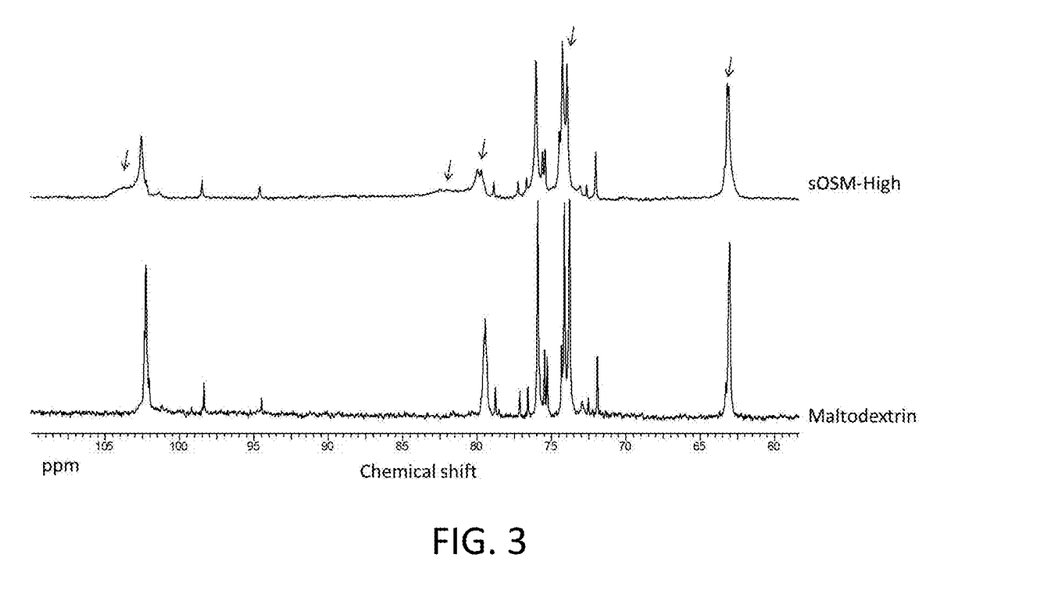
FIG. 3 is a graph of $^{13}$C-NMR spectra of maltodextrin and octenylsuccinic (OS) maltodextrin from approach 2 with DS of 0.094 (sOSM-High)

Structure of α-Amylase Degraded OS Waxy Maize Starches with Different Substitution Patterns Substitution Distribution on Anhydroglucose Units $^{13}$C NMR spectrum of OS maltodextrin (DS 0.094) from approach 2 (sOSM-High) is shown in FIG. 3. Peak broadening was observed for resonances at 102.6 (C-1), 98.3 (C-1 α-reducing), 79.5 (C-4), 76.0 (C-3), 73.9 (C-2), and 63.5 ppm (C-6), indicating that substitutions occurred at the O-2, O-3, and O-6 as well as the reducing ends as previously suggested (Bai & Shi, 2011). DE of sOSM-Low and sOSM-High were 7.1 and 6.5, respectively (Table 2). Because the molecular size of maltodextrin did not change after OSA modification as determined by GPC (data not shown), the decrease in DE reflected that OS substitution occurred at the reducing end. It was calculated that 7.7 and 12.2% of the reducing ends were substituted by OSA for sOSM-Low and sOSM-High, respectively (Table 1).

The OS substitution pattern on the anhydroglucose units (AGU) of OSA-modified maltodextrin prepared from normal maize starch was reported in our previous study (Bai & Shi, 2011). In this study, maltodextrin was prepared from α-amylolysis of waxy maize starch. The NMR results suggest that neither amylose nor the process of α-amylolysis affected the substitution location on AGU.

Amyloglucosidase Hydrolysis

Maltodextrin was 99.4% converted to glucose by amyloglucosidase (Table 2), which was similar to conversions reported for native granular starch (Hood & Mercier, 1978; Richardson, Nilsson, Cohen, Momcilovic, Brinkmalm & Gorton, 2003). The conversion ratio for OS maltodextrin was significantly lower than that of maltodextrin (Table 2), indicating that starch chains carried OS substitution groups and inhibited the action of amyloglucosidase. For OS maltodextrins prepared from approach 1, gOSM-Low and gOSM-High were 93.3 and 83.5% converted by amyloglucosidase, respectively. In comparison, the conversion ratio for sOSM-Low and sOSM-High was 90.8 and 77.2%, respectively (Table 2). Because amyloglucosidase is an exo-enzyme that hydrolyzes α-1,4 and α-1,6 linkages from the starch non-reducing ends, substitution groups in OS maltodextrins from

TABLE 2

Characterization of native starch converted maltodextrin (M) and octenylsuccinate maltodextrins from approach 1 of degree of substitution (DS) 0.018 (gOSM-Low) and 0.092 (gOSM-High) and approach 2 of DS of 0.018 (sOSM-Low) and 0.094 (sOSM-High).

| Parameters | M | gOSM-Low | gOSM-High | sOSM-Low | sOSM-High |
|---|---|---|---|---|---|
| Degree of substitution | 0 | 0.018 | 0.092 | 0.018 | 0.094 |
| AMG hydrolysis (%) | 99.4 ± 0.3 | 93.3 ± 0.0 | 83.5 ± 1.3 | 90.8 ± 0.3 | 77.2 ± 0.6 |
| β-limit value (%) | 41.7 | 39.3 | 37.5 | 36.8 | 34.9 |
| Before debranching |  |  |  |  |  |
| DE[a] | 7.4 ± 0.3 | 7.7 ± 0.1 | 7.5 ± 0.1 | 7.1 ± 0.2 | 6.5 ± 0.2 |
| $DP_n$[b] | 12.8 ± 0.8 | 12.8 ± 0.2 | 13.0 ± 0.5 | 12.8 ± 0.8 | 12.8 ± 0.8 |
| After debranching |  |  |  |  |  |
| DE | 15.8 ± 0.5 | 14.2 ± 1.7 | 13.1 ±0.6 | 14.6 ± 0.2 | 11.7 ± 0.4 |
| $DP_n$ | 6.3 ±0.2 | 7.0 ± 0.8 | 7.6 ± 0.3 | 6.8 ± 0.1 | 8.5 ± 0.3 |
| DE increased (%)[c] | 102.6 | 81.8 | 69.9 | 103.4 | 79.3 |
| Successive β-amylolysis | 100.0 ± 0.0 | 86.9 ± 2.8 | 71.4 ± 0.2 | 88.4 ± 0.5 | 67.4 ± 2.0 |

[a]Dextrose equivalent.
[b]Degree of polymerization. The values of sOSM-Low and sOSM-High were adapted from the $DP_n$ value of maltodextrin.
[c]Calculated by subtracting DE before debranching from DE after debranching and then divided by DE before debranching.

approach 2 were closer to the starch non-reducing ends than the maltodextrins from approach 1.

α-Amylase Hydrolysis

Figure 4:
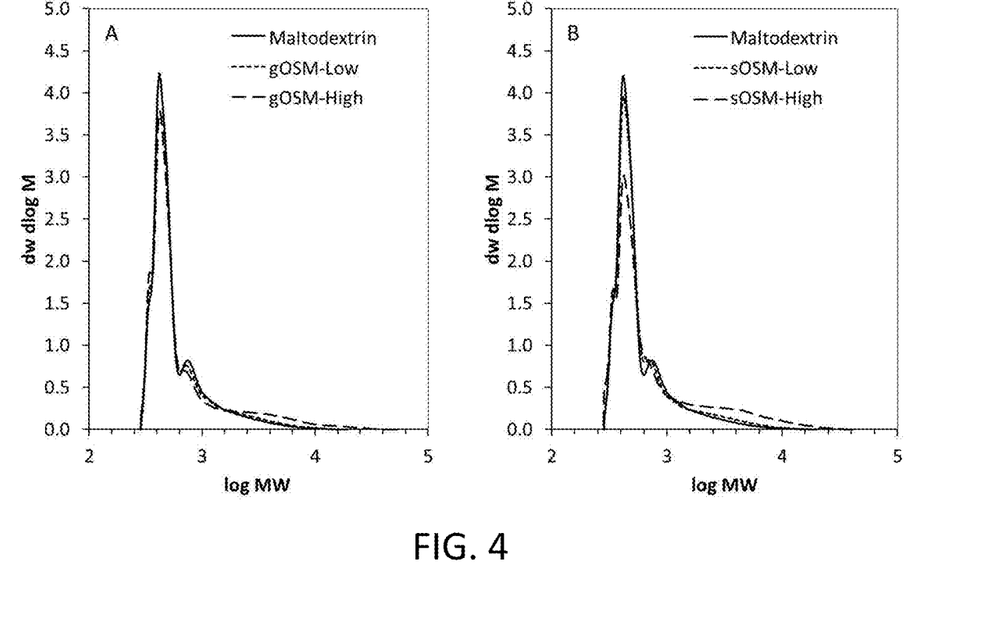
FIG. 4 are elution profiles of α-limit dextrins of maltodextrin (M) and octenylsuccinate maltodextrins obtained from Approach 1 (A) and Approach 2 (B)

GPC elution profiles of α-amylase hydrolysates of maltodextrin and OS-maltodextrins are shown in FIG. 4. Maltodextrin after α-amylolysis had a peak at molecular weight of 4.30E+02 g/mol (Fraction 1) and comprised about 72% of the total starch molecules, primarily glucose, maltose, maltotriose, and maltotetraose. The rest of the molecules (Fraction 2) eluted from 6.63E+02 to 1.06E+04 g/mol were high molecular weight fractions with an average degree of polymerization (DP) of 12 (Fraction 1). The products from α-amylolysis were in agreement with those suggested in the literature (Robyt, 2009). OS maltodextrins from approach 1 (gOSMs) had slightly different elution profiles from maltodextrin. The percentage of molecules eluted in Fraction 2 was 29.0 and 31.2%, which was slightly higher than that from maltodextrin, for gOSM-Low and gOSM-High, respectively. The increase was probably due to the starch molecules containing OS substitution groups that were resistant to α-amylase hydrolysis (He, Liu & Zhang, 2008). Similar results were found for OS maltodextrins from Approach 2 (sOSMs); however, sOSMs had a more predominant peak at 4.09E+03 g/mol compared with gOSMs. The proportion of Fraction 2 increased to 32.9 and 40.6% for sOSM-Low and sOSM-High, respectively, and their corresponding DP was 16 and 18 (Table 3). The results suggested that at the same DS, sOSM was more resistant to α-amylolysis than gOSM. It has been suggested that a minimum sequence length of two unsubstituted glucose residues is required for amylolysis to occur for methylated starch (Steeneken & Woortman, 1994). Although the minimum sequence length required for OS starch might differ from the requirement for methylated starch, amylolysis clearly occurred at glucosidic bonds that were a few anhydroglucose units away from the substitution groups. Therefore, it is possible that the OS substitution groups in gOSMs were closer to each other than sOSMs, and the OS groups in sOSMs were distributed throughout the starch chains.

TABLE 3

Degree of polymerization (DP) of α-limit dextrins of maltodextrin (M) and octenylsuccinate maltodextrins obtained from Approach 1 (A) and Approach 2 (B).

| | α-amylase hydrolysis | | | |
|---|---|---|---|---|
| | Fraction 1 | | Fraction 2 | |
| Sample | DP | % area | DP | % area |
| M | 2 | 72.0 | 12 | 28.0 |
| gOSM-Low | 2 | 71.0 | 13 | 29.0 |
| gOSM-High | 2 | 68.8 | 14 | 31.2 |
| sOSM-Low | 2 | 67.1 | 16 | 32.9 |
| sOSM-High | 2 | 59.4 | 18 | 40.6 |

β-Amylase Hydrolysis

Maltodextrin and OS maltodextrin were hydrolyzed exhaustively by β-amylase; the β-limit values are listed in Table 2. Compared with maltodextrin, β-limit values for OS maltodextrins were significantly lower and decreased with the increase in DS. Results suggest that substitution groups in OS maltodextrin occurred at the outer starch chains and blocked the action of β-amylase. For OS maltodextrins prepared from approach 1, gOSM-Low and gOSM-High had β-limit values of 39.3 and 37.5%, respectively. In comparison, β-limit values for sOSM-Low and sOSM-High were 36.8 and 34.9, respectively. OS maltodextrins from approach 2 showed lower β-limit values than those from approach 1 at both low and high DS. β-amylase is an exo-enzyme that hydrolyzes α-1,4 linkages from the non-reducing end, and the action of β-amylase was blocked by starch branching points (Robyt, 2009) as well as chemical substitution groups (Hood & Mercier, 1978; Kavitha & BeMiller, 1998; Richardson, Nilsson, Cohen, Momcilovic, Brinkmalm & Gorton, 2003; Zhu & Bertoft, 1997). Therefore, in agreement with the results from amyloglucosidase hydrolysis, OS maltodextrins from approach 2 had more substituents located closer to the non-reducing ends than the OS maltodextrins from approach 1.

Isoamylase Debranching and Successive β-Amylolysis

Figure 5:
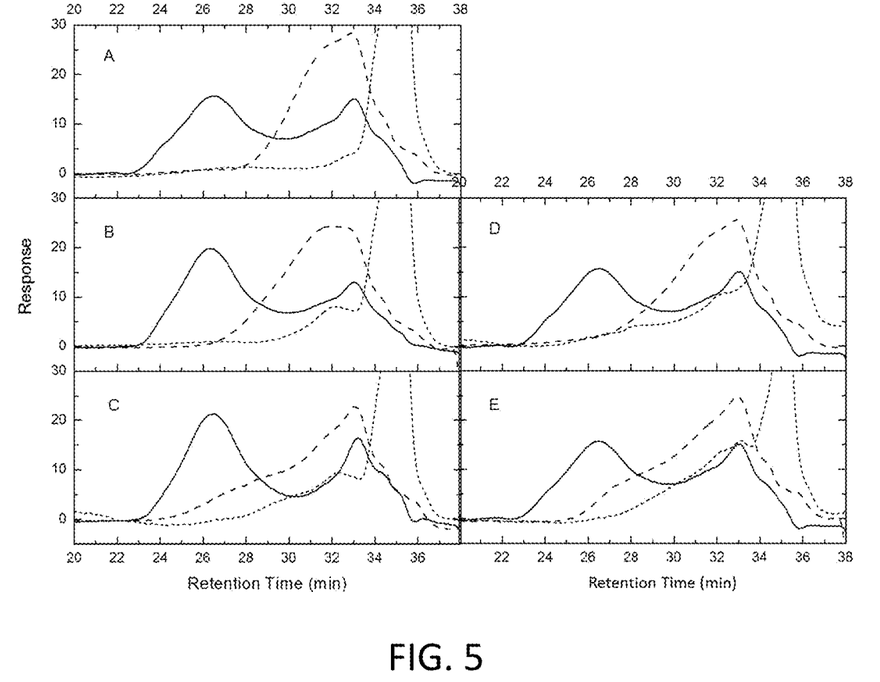
FIG. 5 are elution profiles Elution profiles of starch before debranching (—), after debranching (- - - - -) and β-amylase hydrolysis after debranching (· · · · · ·): maltodextrin (A), octenylsuccinate maltodextrins from approach 1 of degree of substitution (DS) of 0.018 (gOSM-Low) (B), and 0.092 (gOSM-High) (C) and approach 2 of DS of 0.018 (sOSM-Low) (D) and 0.094 (sOSM-High) (E)

The elution profiles of isoamylase debranched maltodextrin and OS maltodextrins as well as their β-limit dextrins from GPC are shown in FIG. 5. Debranched maltodextrin (dashed line) had an elution profile from 28 to 36 min. It had a DE of 15.8, which was more than doubled from maltodextrin before debranching (solid line). The average DP of debranched maltodextrin was 6.3 (Table 2). Exhaustive β-amylolysis completely converted debranched maltodextrin to maltose (dotted line), suggesting all linear-type molecules in the debranched maltodextrin.

For OS maltodextrins from approach 1 (gOSMs), gOSM-Low after debranching eluted from 27 to 35 min indicating that it contained larger molecular size than debranched maltodextrin. DE of debranched gOSM-Low was 14.2, which was an 81.8% increase from 7.8 (DE before debranching) (Table 2). Compared with the 102.6% increase in maltodextrin (Table 2), much fewer starch chains were released by isoamylase from gOSM-Low. These results suggest that the OS substitution groups probably were close to the branching points of starch molecules that inhibited the action of isoamylase. Debranched gOSM-Low was further treated by β-amylase and was ca. 87% converted to maltose (Table 2). The elusion profile of β-limit dextrin of debranched gOSM-Low had a peak at 32 min, which was absent in that of maltodextrin (FIG. 5-B). In previous studies, OS substitution occurred primarily near the branching points of the granular OS starch at DS 0.018. Therefore, the peak 32 min was most likely attributed to branching points containing OS substitution groups. Debranched gOSM-High eluted at 24 min (FIG. 5-C), representing high molecular size fraction. DE of debranched gOSM-High was 7.6, which was 69.9% increase from DE before debranching (Table 2). Compared with the maltodextrin and gOSM-Low, fewer starch chains were released by isoamylase, suggesting that more OS substitution occurred near the branching points. β-amylase treated debranched gOSM-High eluted from 28 min, and only 71.4% of starch was converted to maltose. These results suggest that the β-limit dextrin of debranched gOSM-High contained starch molecules with high molecular size because some OS substitution probably occurred close to the branching points and some OS groups were close to the non-reducing ends.

For OS maltodextrins from approach 2 (sOSMs), GPC profiles of sOSM-Low and sOSM-High are shown in FIG. 5. Compared with the debranched maltodextrin, a high molecular size fraction was observed for debranched sOSM-Low, suggesting that OS substitution was close to the branch points. DE of debranched sOSM-Low was 14.6. Compared with the DE before debranching, an increase of 103.4% was observed (Table 2). This value was similar to that of maltodextrin and higher than gOSM-Low, suggesting that fewer OS groups were located close to the branching points in sOSM-Low than in gOSM-Low. Debranched sOSM-Low was 88.4% converted to maltose, which was slightly lower than gOSM-Low (Table 2). In addition, a high molecular size fraction at 28 min was observed for β-limit dextrin of debranched sOSM-Low. These results suggested that some OS groups in sOSM-Low were probably located close to the non-reducing ends of the starch chain. When DS in sOSM increased to 0.094, significant resistance to the debranching enzyme was observed. The elution profile of debranched sOSM-High showed that the sample contained a high molecular size fraction at 27 min (FIG. 5-E). In addition, DE of debranched sOSM-High was 11.7, a 79% increase from before debranching. These results suggest that some OS substitution groups occurred close to the branching points of sOSM-High; however, compared with the OS maltodextrins from Approach 1, fewer OS groups were found close to the branching points. The β-limit value for debranched sOMS-High was 67.4, which was lower than that of gOSM-High (Table 2) and suggests that more OS groups in sOSM-High occurred close to the non-reducing ends of the starch chains than in gOSM-High. Compared with the gOSM, OS substitution in sOSM appeared to be randomly distributed along the starch chains.

Some have suggested that chemical substitution occurred preferentially in the amorphous region of starch granules where the branching points are located (Steeneken & Smith, 1991; Steeneken & Woortman, 1994; van der Burgt, Bergsma, Bleeker, Mijland, Kamerling & Vliegenthart, 2000a, b; van der Burgt et al., 1998, 1999, 2000b). The outer chains of amylopectin were tightly packed into crystalline lamellae and were inaccessible to the chemical reagents. In previous studies, OS substitution was suggested to occur predominantly at the amorphous region of the starch granules. OS starch of DS 0.018 had OS groups located close to the branching points, whereas the OS substitution in OS starch of DS 0.092 occurred near non-reducing ends as well as the branching points. After the granular OS starches were converted by α-amylolysis, the location of the substitution groups should not change. The present study confirmed that OS maltodextrin from Approach 1 of DS 0.018 (gOSM-Low) had substitution groups located close to the branch points, whereas highly substituted OS maltodextrin of DS 0.092 (gOSM-High) had substitution groups close to the branching points as well as the non-reducing ends. In comparison, for OS maltodextrins from approach 2, OSA was reacted with maltodextrin, which is amorphous and completely soluble in water. All the starch molecules were available for reaction. In the present example, OS substitution was not restricted in a certain part of the starch as in the granular OS starch. OS groups were randomly distributed along the starch chains. Even at low DS of 0.018, substituents were found close to the non-reducing ends of OS maltodextrin.

In conclusion, OS starches with different substitution distributions were prepared from two approaches. One product (gOSMs) had localized OS substitution near the branching points at low DS of 0.018 and near branching points as well as non-reducing ends at high DS of 0.092. The other product (sOSMs) had OS groups distributed randomly throughout the starch chains, and OS substitutions were found close to the branching points as well as the non-reducing ends at both low and high DS.

Example 2

In this example, the objective was to prepare alpha-amylase-degraded octenylsuccinate (OS) waxy potato starches, and make emulsions using degraded OS waxy potato starch and vitamin E to check if the emulsions created are good emulsions.

Materials

Waxy potato starch was obtained from Avebe (Veendam, the Netherlands). Octenylsuccinic Anhydride (OSA) was donated from Gulf Bayport Chemicals L.P. (Pasadena, Tex., US). Other chemicals were all analytical grade.

Methods

Preparation of α-Amylase-Degraded OS Starch

Approach 1 (OSA Reaction+Enzyme Degradation)

Preparation of α-amylase-degraded OS starch from Approach 1 is shown in FIG. 1. Granular waxy potato starch was first reacted with OSA in an aqueous slurry system. Waxy potato starch (500 g) was suspended in distilled water (750 g) with agitation under an overhead stirrer. Sodium sulfate (5% based on the dry weight of starch) was added to starch slurry. Starch suspension (1250 mL) of 40% solid content was adjusted to pH 7.5 by 3% (wt %) NaOH. OSA (3% or 15% based on the dry weight of starch) was added to the starch slurry while pH was maintained at 7.5 by 3% (wt %) NaOH during the reaction. After pH stabilized for 30 min, the reaction was terminated by adjusting pH to 6 with 1 N HCl. OS starch was recovered by filtration, washed by methanol, and dried in an oven at 40° C.

The OS starches were converted to OS maltodextrins by α-amylase hydrolysis. α-amylase (Ban 480L) (0.01, 0.2, or 0.05% based on the dry weight of starch) was added to the starch slurry of 18% solids. pH of the slurry was adjusted to 6.0-6.4 by 1 N NaOH. Starch hydrolysis was carried out at 80° C. water bath in 15-20 min. α-amylolysis was stopped by holding the starch solution to boiling water for 20 min, and then cooled to room temperature. The OS maltodextrin obtained was recovered by spray drying (Spray dryer, LPG-5 model; Jiangsu Fanqun Drying Equipment Factory, Jiangsu, China).

Approach 2 (Enzyme Degradation+OSA Reaction)

Preparation of α-amylase-degraded OS starch from Approach 2 is shown in FIG. 1. Granular waxy potato starch was first hydrolyzed by α-amylase as described in Approach 1. Waxy potato starch (360 g) was suspended in distilled water (1,640 g) with agitation under an overhead stirrer. The pH of starch suspension (18% solid content) was adjusted to 6.0-6.4 by 1 N NaOH. α-amylase (Ban 480L) (0.005, 0.01, or 0.02% based on the dry weight of starch) was added to the starch slurry. Starch hydrolysis was carried out at 80° C. water bath in 20 min. α-amylolysis was stopped by holding the starch solution to boiling water for 20 min, and then cooled to room temperature.

The starch solution was then reacted with 3% OSA (based on the dry weight of waxy potato starch) as described in Approach 1. pH was maintained at 7.5 by 3% (wt %) NaOH during the reaction. After the pH stabilized for 30 min, the reaction was terminated by adjusting the pH to 6 with 1 N HCl. The OS maltodextrin was recovered by spray dryer. The spray drying conditions were inlet temperature 180° C. and outlet temperature 100° C.

Preparation of Vitamin E Emulsion

After preparation, OS starch solution in water at 7.5% or 10% solid content was dissolved totally. Vitamin E acetate of 7.5% or 5% (based on the weight of aqueous phase) was added. The starch solution was pre-homogenized by a bench-top homogenizer (PRO 350, PRO Scientific Inc, Oxford, Conn.) at 6000 rpm for 5 min. the pre-emulsion was homogenized by a microfluidizer (M-110P, Microfluidics, Newton, Mass.) for 5-7 passes at 30,000 psi. Particle size was measured 1 h after preparation of the emulsion by a laser diffraction particle size analyzer (LA-910, HORIBA Ltd., Tokyo, Japan). Emulsions were stored in the dark at room temperature. After 7 days, particle size was measured again.

Results

Six different degraded waxy potato starches in enzyme conditions (Table 4) were compared with some known OS starches which can make good emulsions with vitamin E (Table 5), the viscosity of 3-7F and 3-9F degraded starches was higher than that of commercial starches, indicating that degradation was not too much.

TABLE 4

Viscosity of various degraded waxy potato starches at different solid content.

| Product | Treatments | Enzyme (Ban480) condition | Viscosity (cp)* 20% | 15% | 10% | DE |
|---|---|---|---|---|---|---|
| 3-3F | OSA (3%) + α-amylase | 0.05%, 80° C. 15 min | 14 | | 7 | 6.57 |
| 3-5F | OSA (3%) + α-amylase | 0.02%, 80° C., 20 min | 62 | | 13 | 5.33 |
| 3-7F | OSA (3%) + α-amylase | 0.01%, 80° C., 20 min | 407 | 128 | 23 | 3.77 |
| 3-6F | α-amylase + OSA (3%) | 0.02%, 80° C., 20 min | 11 | | 6 | 7.42 |
| 3-8F | α-amylase + OSA (3%) | 0.01%, 80° C., 20 min | 115 | | 15 | 4.82 |
| 3-9F | α-amylase + OSA (3%) | 0.005%, 80° C., 20 min | 329 | 114 | 21 | 4.00 |

*Viscosity was measured using Brookfield spindle #21 running at 100 rpm.

Emulsion Work with Orange Oil

Each of the OSA modified starch converted maltodextrin (samples 3-5F and 3-7F), or OSA modified maltodextrin (samples 3-6F, 3-9F) (10.0 g) was dissolved in water (23.3 g). The solution was mixed by an overhead stirrer for 15 min and then placed in a water bath at 60° C. for 2 h. Solution was transferred to a warren blender (Model 31BL92, Waring Commercial, New Hartford, Conn.). Orange oil (1.5 g) was slowly added to the starch slurry while mixing at low speed over 1 min. The mixture was continuously mixed for additional 1 min and subsequently mixed at high speed for 2 min. The crude emulsion was transferred to a clear jar and homogenized by a conventional homogenizer (PRO 350, PRO Scientific Inc., Oxford, Conn.) at a speed of 350,000 to 400,000 RPM. Viscosity was analyzed by a viscometer (DVII+ PRO, Brookfield, Mass., USA) at room temperature and pH was measured by a pH meter immediately after the emulsion was prepared. Emulsion sample was sealed and stored at 50° C. for 24 h.

Analysis of Particle Size Distribution

Particle size distribution of the orange oil emulsion was analyzed by a laser scattering particle size analyzer (LA-910, HORIBA INSTRUMENTS, INC. Irvine, Calif.). Fresh emulsion and emulsion that was stored at 50° C. of 24 h were both analyzed.

TABLE 5

| | Particle size (um) | |
|---|---|---|
| Sample | fresh | 24 h |
| 3-5F | 1.856 ± 0.884 | 2.608 ± 1.004 |
| 3-7F | 1.924 ± 1.120 | 2.379 ± 1.098 |
| 3-6F | 2.572 ± 1.032 | separation |
| 3-9F | 2.526 ± 1.151 | ≥5 |

After starch preparations, emulsions were made with each degraded waxy potato starch and vitamin E in different ratio of formulations (Table 6). The particle size of all emulsions is shown in Table 7.

TABLE 6

Formulation of vitamin E emulsion

| Oil:Starch | VE (g) | Oil Starch (g) | Water (mL) |
|---|---|---|---|
| 2:2 (1:1) | 7.5 | 7.5 | 85 |
| 1:2 | 5 | 10 | 85 |

TABLE 7

Particle size of emulsions made with lab-made OS waxy potato starch sample and vitamin E in fresh and 7 days.

| | | Micro-fluidizer (μm) | | | | | |
|---|---|---|---|---|---|---|---|
| | Oil:Starch | Fresh | | | 7 days | | |
| Starch | (g/g) | 5 pass (μm) | 6 pass (μm) | 7 pass (μm) | 5 pass (μm) | 6 pass (μm) | 7 pass (μm) |
| 3-3 | 1:1 | | N/A | | | N/A | |
| (14 cp) | 1:2 | 2.883 ± 3.439 | 2.199 ± 1.871 | 2.086 ± 1.610 | | | |
| 3-5F | 1:1 | 1.363 ± 1.180 | 1.497 ± 0.974 | 1.511 ± 0.931 | | N/A | |
| (62 cp) | 1:2 | 1.124 ± 0.931 | 0.721 ± 0.595 | 0.675 ± 0.506 | 1.260 ± 1.147 | 0.769 ± 0.705 | 0.99 + 1.034 |
| 3-7F | 1:1 | 0.702 ± 0.647 | 0.657 ± 0.482 | 0.532 ± 0.356 | | N/A | |
| (407 cp) | 1:2 | 0.603 ± 0.409 | 0.604 ± 0.434 | 0.684 ± 0.508 | | | |
| 3-6F | 1:1 | | N/A | | | N/A | |
| (11 cp) | 1:2 | | | | | | |
| 3-8F | 1:1 | ≥5 | ≥5 | ≥5 | | N/A | |
| (115 cp) | 1:2 | 4.925 ± 2.117 | ≥5 | ≥5 | | | |
| 3-9F | 1:1 | 4.078 ± 3.129 | 4.032 ± 2.998 | 4.016 ± 2.931 | | N/A | |
| (329 cp) | 1:2 | 3.822 ± 2.503 | 3.750 ± 2.511 | 3.734 ± 2.461 | | | |

N/A: Severe phase separation was observed.

Example 3

In this example, emulsions of comprising OSA modified starch were prepared.

Methods

Preparation of Orange Oil Emulsion

OSA modified starch converted maltodextrin (OS-S-M) by Approach 1, OSA modified maltodextrin (OS-M) by Approach 2 or unmodified maltodextrin (10.0 g) was dissolved in water (23.3 g). The solution was mixed by an overhead stirrer for 15 min and then placed in a water bath at 60° C. for 2 h. Solution was transferred to a warren blender (Model 31BL92, Waring Commercial, New Hartford, Conn.). Orange oil (1.5 g) was slowly added to the starch slurry while mixing at low speed over 1 min. The mixture was continuously mixed for additional 1 min and subsequently mixed at high speed for 2 min. The crude emulsion was transferred to a clear jar and homogenized by a conventional homogenizer (PRO 350, PRO Scientific Inc., Oxford, Conn.) at a speed of 350,000 to 400,000 RPM. Viscosity was analyzed by a viscometer (DVII+ PRO, Brookfield, Mass., USA) at room temperature and pH was measured by a pH meter immediately after the emulsion was prepared. Emulsion sample was sealed and stored at 50° C. for 24 h.

Analysis of Particle Size Distribution

Particle size distribution of the orange oil emulsion was analyzed by a laser scattering particle size analyzer (LA-910, HORIBA INSTRUMENTS, INC. Irvine, Calif.). Fresh emulsion and emulsion that was stored at 50° C. of 24 h were both analyzed.

Optical Microscope

Freshly prepared emulsion was diluted 100 times with distilled water and analyzed by a light microscope (BX51, Olympus Co., Japan).

Results

Figure 6:
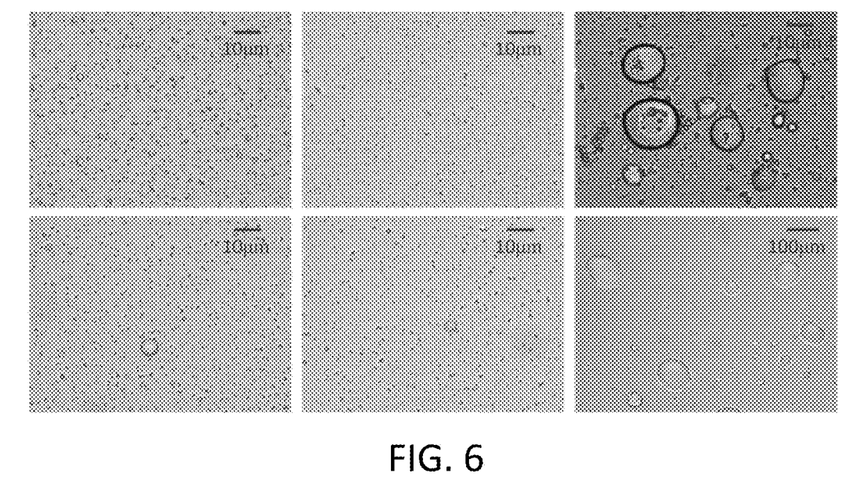
FIG. 6 comprises microscope graphs of emulsions that were prepared from OS starch converted maltodextrin (OS-S-M)(A), OS maltodextrin (OS-M)(B) and maltodextrin (C), the upper graphs were from fresh emulsions (A-1, B-1 and C-1), and the bottom graphs were from stored emulsions (50° C., 24 h) (A-2, B-2 and C-2)
Figure 7:
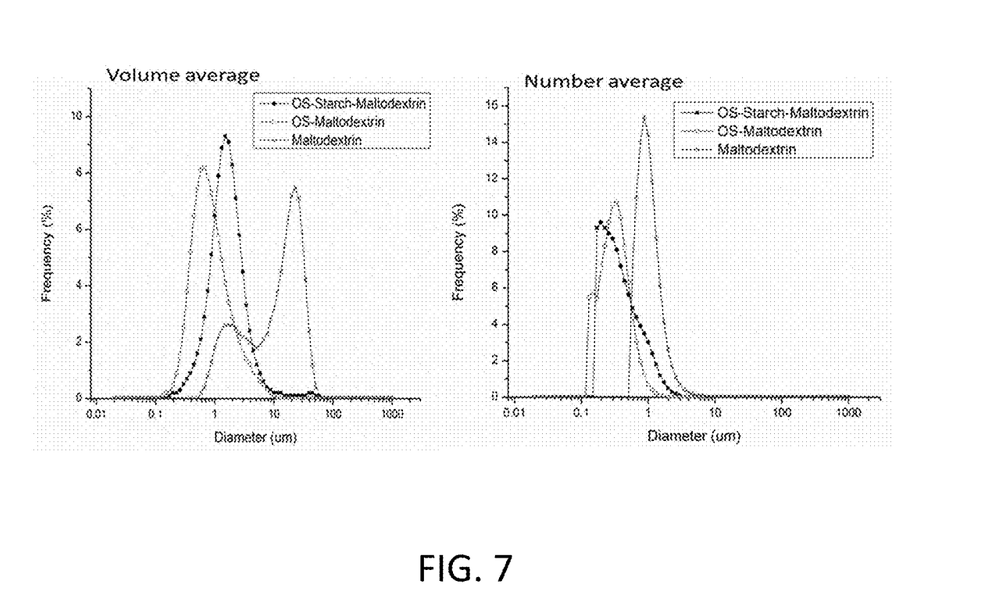
FIG. 7 comprises graphs of particle size distribution of fresh emulsions that were prepared from OS starch converted maltodextrin (OS-S-M), OS maltodextrin (OS-M) and maltodextrin, the graph on the left was plotted as volume average particle size distribution, and the graph on the left was plotted as number average particle size distribution.
Figure 8:
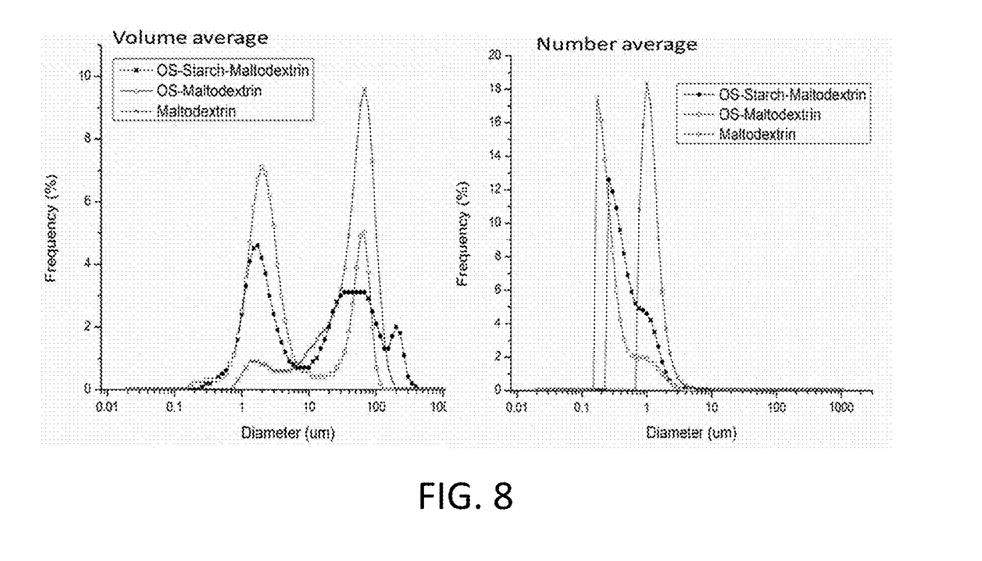
FIG. 8 comprises graphs of particle size distribution of stored emulsions (50° C., 24 h) that were prepared from OS starch converted maltodextrin (OS-S-M), OS maltodextrin (OS-M) and maltodextrin, the graph on the left was plotted as volume average particle size distribution, and the graph on the left was plotted as number average particle size distribution.

Viscosity of the emulsion prepared from maltodextrin was 14.0 cP, which was very close to the emulsions that were prepared from OS-M and OS-S-M. All the three samples had pH in the range of 4.9~5.4. Native maltodextrin showed low emulsification properties as large oil droplets were observed (FIG. 6). Droplet size of OS-S-M emulsion appeared to be larger than that of OS-M. Similar results were obtained from particle size analyzer. Volume average oil droplet size of the two emulsions prepared from OS maltodextrins was in the range of 0.1 μm to 10 μm. The particle size of emulsion prepared from OS-S-M appeared to be larger than that of OS-M (FIG. 7). Particle size of emulsion prepared from maltodextrin was in the range of 0.1~100 μm and showed a bimodal distribution which suggests a poor emulsion stability. Similar results were seen in the data plotted as number average particle size distribution. After storage at 50° C., particle size of all the emulsions grew bigger (FIG. 8). For the volume average particle size, all the three emulsion samples showed a bimodal distribution in the range of 0.1 to 400 μm. Emulsion that was prepared from maltodextrin had a small fraction of particles in the range of 1~10 μm, whereas majority of the particles were in the range of 10~400 μm. Emulsion of OS-S-M had a small fraction in the range of 0.1~10 μm which to was significantly less than that from OS-M. Similar results were observed in the number average particle size distribution. Emulsion prepared from OS-M may be more stable than that from OS-S-M as suggested by smaller particle size and better tolerance to heating.

We claim:

1. A method of preparing a lipophilic starch comprising:
    dispersing a quantity of a granular starch in a liquid medium to form a starch slurry;
    heating the starch slurry to a temperature of from about 70° C. to about 100° C. cause cooking of the starch while treating the starch with amylase enzymes to hydrolyze the starch;
    neutralizing the amylase enzymes to stop the hydrolysis of the starch;
    adding an organic acid anhydride reagent to the hydrolyzed starch, the organic acid anhydride reagent having the formula wherein R is a dimethylene or trimethylene group and R' is a linear, branched or cyclic alkyl, alkenyl, aralkyl or aralkenyl group having 2 to 20 carbon atoms; and
    reacting the hydrolyzed starch with the organic acid anhydride reagent to form the lipophilic starch.

2. The method of claim 1, wherein the starch slurry comprises from about 5% to about 40% by weight of the granular starch.

3. The method of claim 1, wherein the starch slurry has a pH of from 5.5 to 7 during treatment of the starch with amylase enzyme.

4. The method of claim 1, wherein the neutralizing step comprises adjusting the pH of the starch slurry to be from 2.5 to 3.5.

5. The method of claim 1, wherein the hydrolyzed starch is recovered and dried in between the neutralization step and the addition of the organic acid anhydride reagent.

6. The method of claim 5, wherein the hydrolyzed starch is dispersed in water prior to the addition of the organic acid anhydride reagent to form a starch mixture having a solids content of from about 25% to about 55% by weight.

7. The method of claim 1, wherein the hydrolyzed starch is not washed prior to its reaction with the organic acid anhydride.

8. The method of claim 1, wherein the organic acid anhydride comprises octenylsuccinic anhydride.

9. The method of claim 1, wherein the liquid medium comprises water, an alcohol, or both.

10. The method of claim 1, wherein the amylase enzyme comprises α-amylase.

* * * * *